United States Patent
Maslennikov et al.

[15] 3,688,141
[45] Aug. 29, 1972

[54] SQUIRREL-CAGE ROTORS FOR INDUCTION MOTORS

[72] Inventors: Konstantin Nikolaevich Maslennikov, ulitsa Sibiryakov-Gvardeitsev 9, kv. 11; Jury Vasilievich Argunov; Nikolai Porfirievich Savonkin, both of ulitsa Bljukhera, 48, kv. 58; Rudolf Mikhailovich Smyvin, ulitsa Nakodnaya, 7, kv. 14; Igor Alexeevich Chzhen, prospekt Karlamarxa, 9, kv. 7, all of Novosibirsk, U.S.S.R.

[22] Filed: Oct. 15, 1971

[21] Appl. No.: 189,592

[52] U.S. Cl................................310/211, 310/214
[51] Int. Cl..................................................H02k 3/06
[58] Field of Search.............................310/211–218

[56] References Cited

UNITED STATES PATENTS

| | | |
|---|---|---|
| 2,944,171 | 7/1960 | Alger.......................310/211 |
| 2,956,186 | 10/1960 | Wall.....................310/211 X |
| 3,134,040 | 5/1964 | Barth.........................310/211 |
| 3,153,162 | 10/1964 | Anthony et al............310/211 |
| 3,513,342 | 5/1970 | Sabev........................310/211 |
| 3,519,862 | 7/1970 | Walker......................310/214 |
| 3,594,597 | 7/1971 | Kildishev..................310/214 |

*Primary Examiner*—D. F. Duggan
*Attorney*—Eric H. Waters

[57] ABSTRACT

According to the invention, the squirrel cage rotor of an induction motor comprises a core with slots located on the rotor shaft and comprising split stacks alternating along the shaft axis; the internal parts of the split stacks are set on the rotor shaft, and the outer parts have divergent slots and are separated from the internal parts with annular gaps; the said one-piece stacks are located on the rotor shaft and have deep slots containing trapezoid bars fixed in place with counter-opposed wedges; said inverted wedges rest on the bottoms of the slots of the outer parts of said split stacks.

3 Claims, 5 Drawing Figures

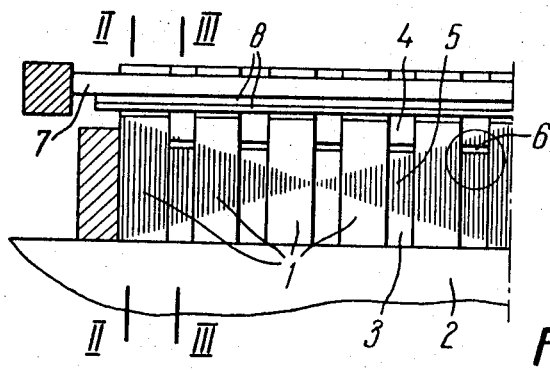
FIG. 1
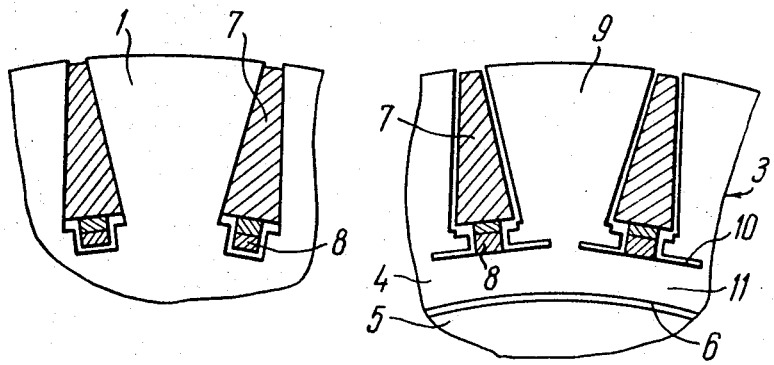
FIG. 2   FIG. 3
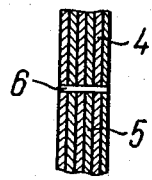   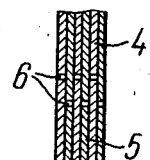
FIG. 4   FIG. 5

SQUIRREL-CAGE ROTORS FOR INDUCTION MOTORS

The present invention relates to electrical engineering and, more specifically, to the squirrel-cage rotors of induction motors.

Known in the prior art are induction motors in which the bars making the squirrel-cage structure are trapezoidal in cross-section. The bars are made in the rotor slots by counter-opposed wedges located between the bars and the slot bottoms.

A disadvantage of the prior-art design is that at starting, especially under adverse conditions, the appreciable heating of the bars as compared with the heating of the rotor core teeth causes the bars to work loose in the slots so that gaps are formed between the bars, slot walls and wedges.

This is explained by the fact that when the bars are wedges in the slots as described above, the thermal expansion of the bars in cross-section leads to a partial plastic deformation (compression) of the bars with the result that the irregularities on the side walls of the rotor core slots are pressed into the bars.

The formation of these gaps may be promoted by the deformation of the irregularities on the side walls of the rotor core slots and the abrasion of the irregularities on the walls of the slots and bars as the latter move in the former due to longitudinal thermal shift. When these gaps appear between the slot walls and bars the latter may vibrate in the slots under the influence of electrodynamic and centrifugal forces at starting so that, if the gaps are large, the bars break in places where they are brazed to the short-circuiting end rings of the rotor. This limits the use of electric motors with the above-described rotors to drive mechanisms with adverse starting such as big flywheel masses. Any loosening of the bars in the slots of explosion-proof motors is impermissible because the vibration of the bars in the slots within the gaps leads to sparking between the bars and slots which may, in turn, entail and explosion.

It is an object of the present invention to provide a squirrel-cage rotor for an induction motor in which the bars are prevented from working loose in the rotor slots by a change in the design of some of the elements fastening the bars in the rotor core slots.

With this object in view, the invention resides in that in the rotor of an induction motor, the rotor core, according to the invention, is made up of two types of stacks alternating along the rotor axis, some of them being split, with their inner parts set on the rotor shaft and their outer parts having divergent slots and separated from the inner ones by annual gaps, and the other being one-piece, with deep slots, while the counter-opposed wedges rest on the bottoms of the slots in the outer parts of the split stacks. In the case of split stacks, it is preferable that their outer parts should have cuts, for instance tangential, at the roots of the rotor core teeth, while in the stacks made of sheet steel these cuts and annular gaps between their outer and inner parts should be made in adjacent laminations radially shifted.

The invention disclosed herein can considerably broaden the field of application for the squirrel-cage induction motors in which the rotor winding is made of trapezoidal bars, especially for adverse starting conditions, including those for driving large flywheel masses, and also explosion-proof motors.

The invention will be more fully understood from the following description of preferred embodiments when read in connection with the accompanying drawings wherein:

FIG. 1 is a partial sectional view of the squirrel-cage rotor of an induction motor, according to the invention;

FIG. 2 shows section II—II of FIG. 1;

FIG. 3 shows section III—III of FIG. 1;

FIG. 4 and FIG. 5 show modifications of annular gaps between the outer and inner parts of split rotor core stacks and the cuts at the roots of the teeth in the outer part of the split stacks.

Referring to FIG. 1, there is a squirrel-cage induction motor containing a core which consists of one-piece stacks 1 made up of laminations, particularly, electrical-sheet-steel laminations, with deep slots (FIG. 2) set on a shaft 2 of the rotor (FIG. 1). Alternating with the one-piece stacks 1 are split stacks 3, for example, of sheet-steel laminations, made up of outer parts 4 and inner parts 5, separated by an annular gap 6 (FIGS. 1, 2, 4). The outer parts 4 of the split stacks 3 of the rotor core have divergent slots (FIG. 3). The inner parts 5 (FIG. 1) of the split stacks 3 are set on the shaft 2 of the rotor. The bars 7 of the squirrel-cage structure are anchored in the core slots by wedges 8. The wedges 8 are located between the bars 7 and the bottom of the slots of the outer parts 4 of the split stacks 3, while the sides of the bars 7 are pressed to the side walls of the slots in the one-piece stacks 1 of the squirrel-cage rotor core.

At the roots of the teeth 9 (FIG. 3) of the outer parts 4 of the split stacks 3 there are cuts 10 of tangential or other shape which, together with the annular gaps 6, form annuli 11. When the bars 7 are anchored in the core slots by the wedges 8 in the manufacture of the squirrel-cage rotors, the annuli 11 are elastically compressed and, as a consequence, the bars 7 are elastically jacked up to the side walls of the slots of the one-piece stacks 1 of the squirrel-cage rotor core.

In service, when the bars 7 of the squirrel-cage rotor are heated at starting, the increase in their section is balanced out by an extra elastic deformation of the annuli 11 in the outer parts 4 of the split stacks 3 of the rotor core.

As the bars 7 cool off, no gaps appear between them and the side walls of the slots in the one-piece stacks 1 because the elastically deformed annuli 11 in the outer parts 4 of the split stacks 3 still jack up bars 7 to the slot walls of the one-piece stacks 1.

For better utilization of the split stacks 3 in the magnetic circuit of the motor when they are made of sheet steel, the annual gaps 6 and the cuts 10 at the roots of the teeth 9 of the outer parts 4 of the split stacks 3 are made in adjacent laminations with a radial shift (FIG. 5), so that in assembly of the stacks the gaps 6 and the cuts 10 (FIG. 3) are overlapped by the adjacent sheets.

What is claimed is:

1. A squirrel-cage rotor for an induction motor comprising a shaft; a slotted core located on said shaft and made up of split and one-piece stacks alternating along the axis of said shaft; in said split stacks their internal parts being set on said rotor shaft, and their outer parts having divergent slots and being separated from the inner parts by annular gaps; said one-piece stacks being placed on said shaft and having deep slots; trapezoidal bars, located in the slots of the said core; counter-opposed wedges to anchor said bars, located in the slots of said core and resting on the bottoms of the slots in the outer parts of said split stacks.

2. A squirrel-cage rotor as in claim 1, in which the outer parts of the split stacks at the roots of the teeth have cuts, in particular tangential.

3. A squirrel-cage rotor as in claim 2, in which, when the stacks are made of sheet steel, the annual gaps between the outer and inner parts of the split stacks of the rotor core and the cuts at the roots at the teeth on the outer parts of the split stacks in adjacent laminations of the split stacks are radially shifted.

* * * * *